United States Patent [19]

Lunde et al.

[11] 4,223,662
[45] Sep. 23, 1980

[54] STRUCTURAL SOLAR COLLECTOR ASSEMBLY

[75] Inventors: Frithjof M. Lunde, Peekskill; Calvin L. Wilbourne, New York, both of N.Y.

[73] Assignee: Warner, Burns, Toan and Lunde, New York, N.Y.

[21] Appl. No.: 888,196

[22] Filed: Mar. 20, 1978

[51] Int. Cl.³ .............................................. F24J 3/02
[52] U.S. Cl. ..................................... 126/424; 126/450
[58] Field of Search ............... 126/419, 424, 425, 447, 126/448, 450

[56] References Cited

U.S. PATENT DOCUMENTS 2,595,905  5/1952  Telkes ................................. 126/419

Primary Examiner—Carroll B. Dority, Jr.
Attorney, Agent, or Firm—Kane, Dalsimer, Kane, Sullivan and Kurucz

[57] ABSTRACT

A structural support assembly and its method of formation for collecting solar energy, regulating heat gain and loss, controlling light transmission and being adapted to be interconnected with other structural elements to form a building. The support system includes an elongated rigid support member having opposing side walls and a base. At least a portion of each side wall is formed of glass. A solar collector assembly is associated with one of the side walls, preferably one to be at a generally southern exposure when incorporated in a building in northern latitudes and vice versa in southern latitude and being positioned to maximize solar gain. An adjustable light weight insulating panel is provided and is positioned with respect to the other of the sides, preferably one to be at a generally northern exposure in northern latitudes and vice versa in southern latitudes when incorporated in a building, and being adjustable to regulate the light received and heat lost or gained through the other side.

30 Claims, 6 Drawing Figures

FIG.1
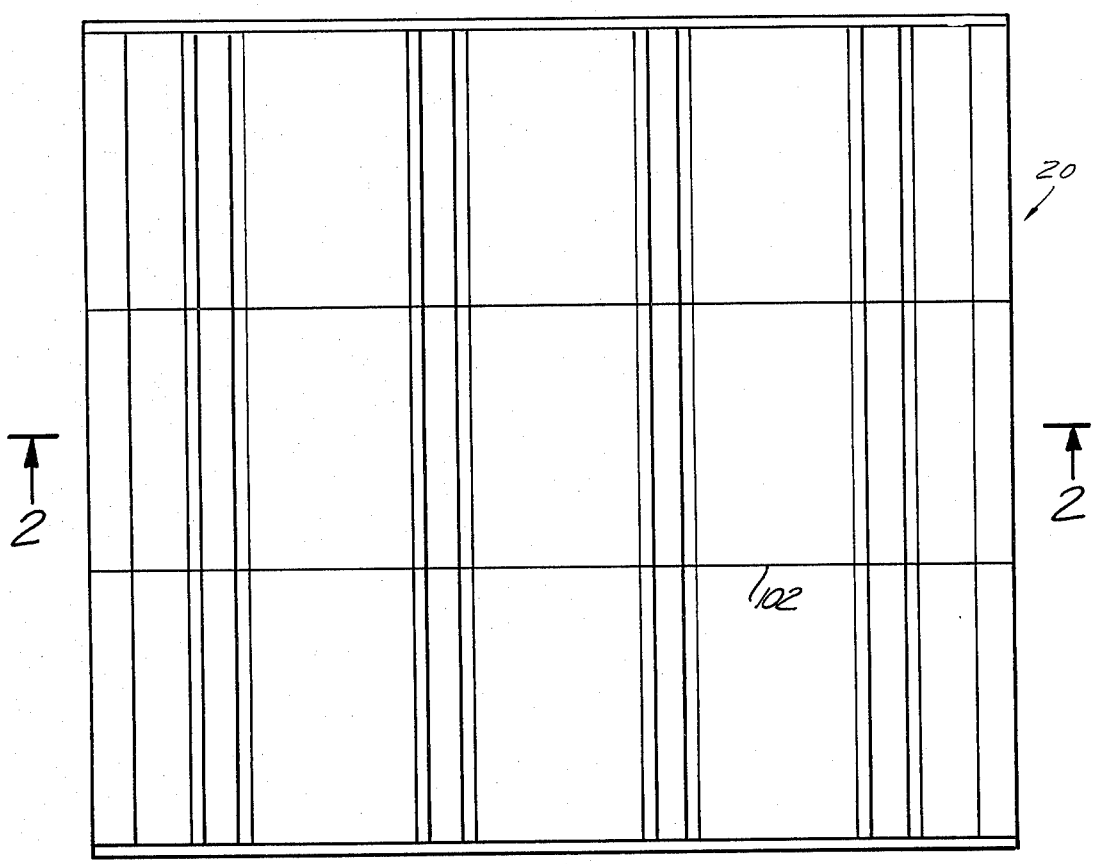
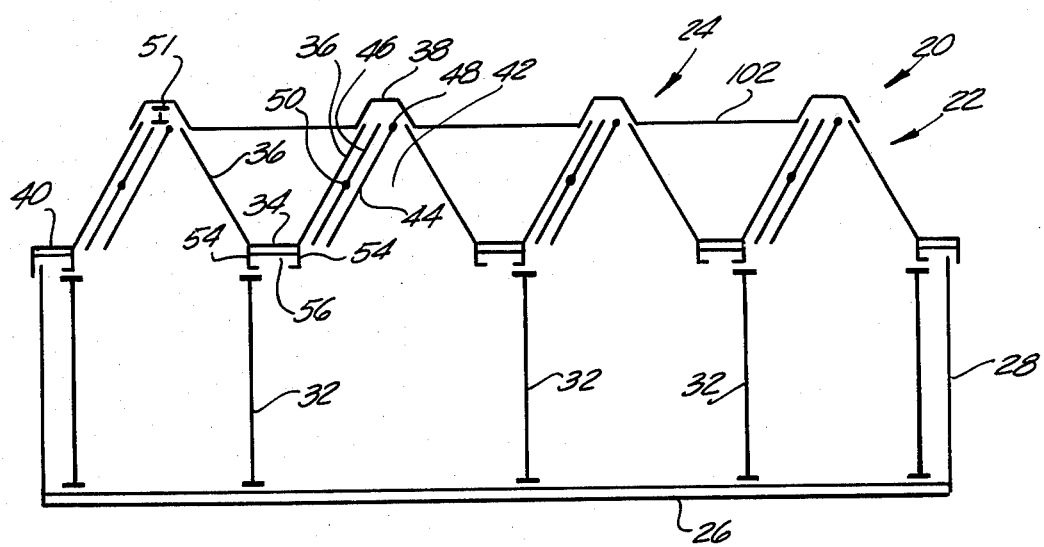
FIG.2

STRUCTURAL SOLAR COLLECTOR ASSEMBLY

BACKGROUND OF THE INVENTION

A significant field of technology today deals with the use of solar energy and energy conservation in general. This applies to building construction and design as well as other fields.

There are many different types of systems that can be employed with a building structure to collect solar energy and transfer the energy within the building for storage and later use. Additionally, there are many structural designs employed today which take advantage of maximum control of the heat loss in the winter and heat gain during the summer months. These varied systems are used with all types of building structures. Examples appear in U.S. Pat. Nos. 2,601,905, 2,625,930; 3,145,707; 3,254,701; 3,270,739; 3,875,925; 3,919,784; 3,935,897; 3,957,109; 3,964,678; 3,965,972; 3,986,491; 3,994,276; 4,029,258; and 4,045,880.

To date most "conventional" thinking concerning collection of solar energy to capture it as heat or to convert it to electricity has been of two kinds when applied to habitable or storage structures; solar collectors typically of the flat-plate type or photo-voltaic arrays applied externally to the weather type building enclosure and additional thereto, or "passive" systems which admit sunlight to the interior of weather-tight structures, used directly as ambient comfort conditioning, or collected and stored as heat by circulation of the air warmed by interior building surfaces heated by the sunlight.

In principle, if a solar system can be integrated into the weather-tight enclosure of a habitable or storage structure, it has a dual function. Externally mounted solar arrays do not do this; they must penetrate the structure with piping, ducting, cables or supports or all of these. It is well established in insurance claims and defects remedial work, that weather-tightness problems are by far the largest class of recurring difficulties confronting architects, structural engineers and builders in current building technology.

Therefore, if a building element such as a roof can be constructed as a weather-tight assembly using proven technology with the solar energy utilization devices integrated inside the weather-tight assembly, the difficulties of solar energy integration into structures are greatly minimized.

In addition, since the arc of the sun's passage dictates the optimum orientation and inclination of solar collection devices, usually at angles between 30° and 60° off the horizontal in the conterminous United States, the collector itself casts a "shadow" and gives rise to the "packing factor" which dictates the spacing of collectors, depending on their vertical rise and inclined dimension. If the "shaded" portion of the projected horizontal plane can be used to useful purpose as for instance to admit reflected and refracted "north light" this constitutes a greater utilization of solar energy, as natural illumination.

By placing solar devices to collect solar heat or light energy and to produce electricity by the photo-voltaic process, inside a weather proof structure it becomes manifestly easier to incorporate mechanisms which produce angular rotation of the solar collection surface as the movement mechanisms are protected from the elements and the solar arrays are protected from wind stresses.

Likewise, since the local conditions of external climate can vary immensely in the United States (and throughout the world) through the annual cycle, sets of conditions of temperture, wind, humidity, snow or ice buildup etc, occur which render the admission of natural light or the gain or loss of heat through a portion of a roof structure inadvisable from the standpoint of interior comfort conditions and building operation economics. If therefore an economical means of controlling the heat loss or gain or the admission of direct or reflected sunlight can be incorporated in connection with a "north light" skylight this would increase its economic usefullness as a building element.

Lastly, if the solar collector assembly and insulating devices and their control devices for rotational or pivotal movement would be inside a weather-tight enclosure not subject to wind stresses their design would be structurally lightened and the strength of actuating devices could be minimized to be of low power input; and therefore capable of automation and or computerized programmed control.

Accordingly, a low cost system which incorporates all of the above objectives in a building structure, that is, collection of solar energy, a stable building structure, control over heat loss and heat gain, and regulation of light transmission is extremely desirable. If all of these features can be incorporated into a structural system, without the necessity of additional structural members, which can then be factory assembled there would be a distinct advantage and significant cost savings. Simplicity and design while achieving the multiple results would certainly be an improvement over existing structures where the above discussed desirable apsects, in regard to heat and light, require the use of additional structural elements, in most cases of a complex nature.

SUMMARY OF THE INVENTION

With the above objectives in mind, it is among the primary objectives of the present invention to provide a support system which is adaptable to be utilized as a structural component of the roof or sides of a building and which has incorporated therein a solar collection assembly and an insulating reflective panel which are pivotable with respect to the glass portions of the assembly as desired depending upon whether light is to be received through the glass portion or the glass portion is to be insulated from heat loss or gain. The assembly includes a further glass portion for cooperation with the solar collector assembly to accumulate solar energy for distribution and use within the building. The system is designed for attachment with additional similar assemblies or members to form part of the overall frame structure of the building without the need for additional structural attachments to the assembly for solar collection purposes or for control of light and heat loss and gain with respect to the building.

A further objective is to provide an assembly which is designed for attachment to further similar assemblies to form the roof structure or the side wall structure of a building and the members include appropriate solar collection assembly means and a skylight panel for maximizing natural illumination and control of light received and heat loss or gain with respect to the building.

The basic assembly of the present invention is designed to provide a base for containing appropriate electrical and mechanical elements such as lighting, heating, ventilating and air conditioning distribution equipment by providing an appropriate mechanical trough exposed to the interior of the building.

A further objective is to provide a support system of the above type with a solar collection assembly which is rotatable with respect to a glazed surface of the assembly so that the angle of maximum efficiency can be maintained to maximize or minimize solar gain as desired.

A further objective is to provide a pivotable light weight panel which is of an insulating material and can be pivoted toward and away from a glass portion of the support member for controlling heat gain or loss and transmission of light.

It is contemplated that both the solar collection assembly and the light weight insulating panel can be adjusted manually or automatically. Additionally, it is contemplated that appropriate pawl and ratchet assemblies can be provided on the assembly and the solar collection assemblies and light weight panels to facilitate the shifting of both with respect to the glazed portions of the structure.

The structural members of the assembly can be of a conventional elongated configuration of normal beam size and design and can be interconnected when arranged in parallel relationship by means of appropriate cap joints and appropriate joints to the sides and ends of the building. In this manner a roof structure is provided. Additionally, the assemblies when arranged in side by side relationship can be braced by appropriate means incorporated within each assembly.

A variety of different types of assembly configurations are possible. One preferred design employs a horizontal base and a pair of opposing side walls extending upwardly and outwardly from the horizontal base thus forming an open U-shaped assembly wider at the open end. When the trusses are arranged in side by side relationship, a solar chamber is provided between adjacent sides of trusses in which an appropriate solar collection assembly and insulating panel are arranged in operable fashion.

Other types of cross-sectional designs include a triangular truss with a horizontal base and a pair of opposing sides extending from the base upwardly and inwardly to an apex. This type of member would be arranged in side by side relationship as well. A further design employs a pair of opposing sides extending downwardly and inwardly to a base apex. Once again the members would be arranged side by side and appropriate solar collection assemblies and skylight panels can be arranged between adjacent sides.

In summary, a structural solar collector assembly and its method of formation and use is provided in which the assembly is a structural support member designed for use in collecting solar energy, controlling heat loss and gain with respect to the exterior of a building and controlling the passage of light through the glass portions of the building. The assembly is adapted to be interconnected with other structural elements to form a building structure. The assembly includes an elongated rigid support member having opposing side walls and a base. At least a portion of the side walls are formed of glass. A solar collector assembly is associated with one of the side walls, preferably one to be at a generally southern exposure when incorporated in a building in northern latitudes and vice versa in southern latitudes, so as to maximize solar gain. A skylight panel is provided on the other of the sides, preferably one to be at a generally northern exposure in nothern latitudes, and vice versa in southern latitudes when incorporated in a building structure. Adjacent the skylight portion is a light weight, insulating panel which is adjustable to regulate the light received and heat loss and gain through the skylight portion of the assembly. Means is provided for mounting the assembly to adjacent building structure members and form an integral part of the building support structure.

Finally, the whole of each assembly is designed so as to be able to be factory-produced, and transported from and erected onto and connected to other structural elements and to other such assemblies so as to form an entire roof or wall structure of a building.

With the above objectives among others in mind, reference is made to the attached drawings.

BRIEF DESCRIPTION OF THE DRAWINGS

FIG. 1 is a schematic top plan view of a building formed with a plurality of structural solar collector assemblies of the invention;

FIG. 2 is a cross sectional view thereof taken along the plane of line 2—2 of FIG. 1;

DETAILED DESCRIPTION

Figure 3:
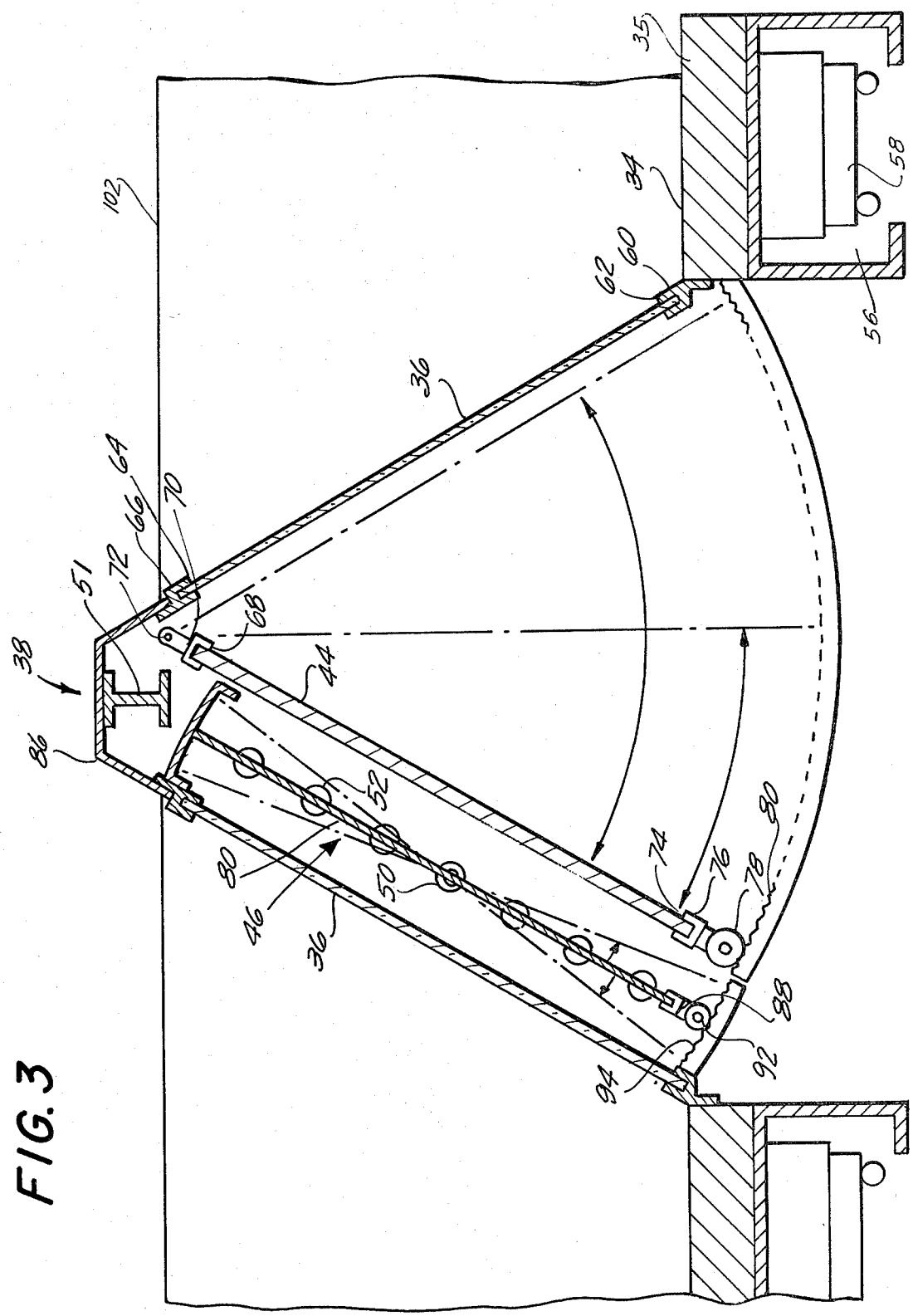
FIG. 3 is an enlarged fragmentary sectional view of the portions of the assembly forming a "sawtooth" roof structure with solar utilization and control devices interior thereto.

As shown in FIGS. 1 and 2, a building 20 is constructed with the use of a plurality of structural solar collector assemblies 22 arranged in side by side relationship and interconnected to form a roof 24 for the rigid building 20. Additionally, the building includes a foundation 26 and four peripheral side walls 28 to complete its rectangular configuration. Where appropriate, internal vertical columns 32 are provided for additional internal support for the roof assemblies 22.

Each assembly 22 forms an integral part of the supporting roof structure and includes a flat base 34 and a pair of opposing side walls 36 extending upwardly and outwardly from the base. The base and side walls extend the length of the building. Other design configurations are contemplated as well for the truss configuration such as a rectangular shape with an enlarged base and two opposing side walls extending upwardly and inwardly to an apex and a system where each truss member would be V-shaped to provide a pair of opposing side walls extending upwardly and outwardly from the bottom vertex. In the depicted form, the side wall 36 of adjacent trusses are interconnected at their free ends by means of a cap joint 38 and to the end walls and side walls of the building by appropriate end caps 40. Similar appropriate connections can be used to attach the other configurations discussed above.

Mounted in each solar chamber 42 and interconnected with the fixed structure is a pivotable insulating and reflecting panel 44 and a rotatable solar collector assembly 46. If desired, the solar collector assembly can be fixed at a desired angle with respect to the adjacent side wall of each roof assembly 42. At least portions of the side wall of each side 36 of each assembly 22 is formed of glass or other well known conventional transparent building material to permit transfer of light for lighting purposes or for solar heat collection or photo-voltaic electric generation. In the depicted embodiment, solar collector assembly 46 is of an adjustable or rotatable type to maximize or minimize solar gain or optimize angular position with respect to the sun. Alternatively, it can be fixed at a desired orientation.

The pivot of insulating panel 44 in the depicted embodiment is accomplished by pivoting the panel about a pivot point 48 located at its upper end. The solar collector assembly is shiftable by permitting its pivoting about a fixed pivot point 50 intermediate its ends at a central location.

Additional support at the cap joint 38 is provided by an inserted elongated I-beam or other conventional structural member 51 for each cap joint.

Each base 34 has a pair of opposed downwardly and inwardly extending flanges or similar structural assembly 54 to form an open trough 56. The trough 56 is adaptable for use as a mechanical trough for the passage of appropriate lighting, heating, ventilating and air conditioning and other mechanical and electrical distribution assemblies and conduits. Thus, appropriate troughs are provided across the entire building at the location of each successively aligned roof assembly 22.

More specific details of the roof structure 24 are depicted in FIG. 3. The weather proof enclosure assemblies which form the exterior face of the solar collector assembly and the skylight assembly, respectively, are mounted at the location of the glass portion of each side 36 of each assembly 22. As shown, base 34 has appropriate mechanical and electrical equipment passing through the trough therein. Additionally, base 34 in conjunction with adjacent members form a water tight continuous assembly which serves to collect rain water, ice and snow and to conduct water therefrom to roof drains incorporated within the horizontal upper surface of the base 34. Flashing 35 which consists of one of a number of impervious sheet roofing products is laid upon the structure of the base 34. A grooved extension 60 is affixed to the base 34 and has its groove 62 in position to receive the bottom end of the glazed side wall 36 therein. The upper end of each side wall 36 is held in a similar groove 64 in a connector 66 attached to the remainder of cap joint 38. Connectors 60 and 66 can be attached to the fixed supporting structure by any conventional means such as welding. Similarly, I-beam 51 can be welded or otherwise conventionally mounted in position within the cap joint 38. As shown in FIG. 3, both of the depicted side walls 36 on adjacent assemblies 22 are captured in the same manner within grooves of appropriate connectors.

Insulating and reflecting panel 44 has its upper end seated and fixed in a notch 68 of connector fitting 70. Connector fitting 70 is attached by a pivot pin 72 to the rigid interconnected structure in a conventional manner. The lower end of panel 44 is housed in a notch 74 of a pawl member 76. The other end of pawl member 76 has a disc or wheel 78 thereon which is tracked and movable along an angular ratchet path 80 affixed in a conventional rigid manner to the remainder of the roof structure 24. An appropriate manual or automatic control (not shown) of conventional nature can be used to move the panel 44 along the ratchet track 80 in the direction depicted by arrows of FIG. 3 toward and away from the glass portion of adjacent side 36. In this manner, when it is desirable to receive light through the adjacent side 36, the panel 44 can be shifted away from the adjacent glass side whereupon light and if desired heat can be received therethrough. When it is desired to prevent heat loss or obstruct solar heat gain through side 36 adjacent to the insulating panel, the panel 44 can be shifted into covering alignment with the adjacent side so as to prevent heat loss therethrough and in other months excessive heat gain therethrough. Panel 44 can be formed of a conventional insulation material such as foamed plastic and if desired can have an appropriate reflector/insulator surface such as a granular light-dispersing surface, for example a beaded screen.

Figure 4:
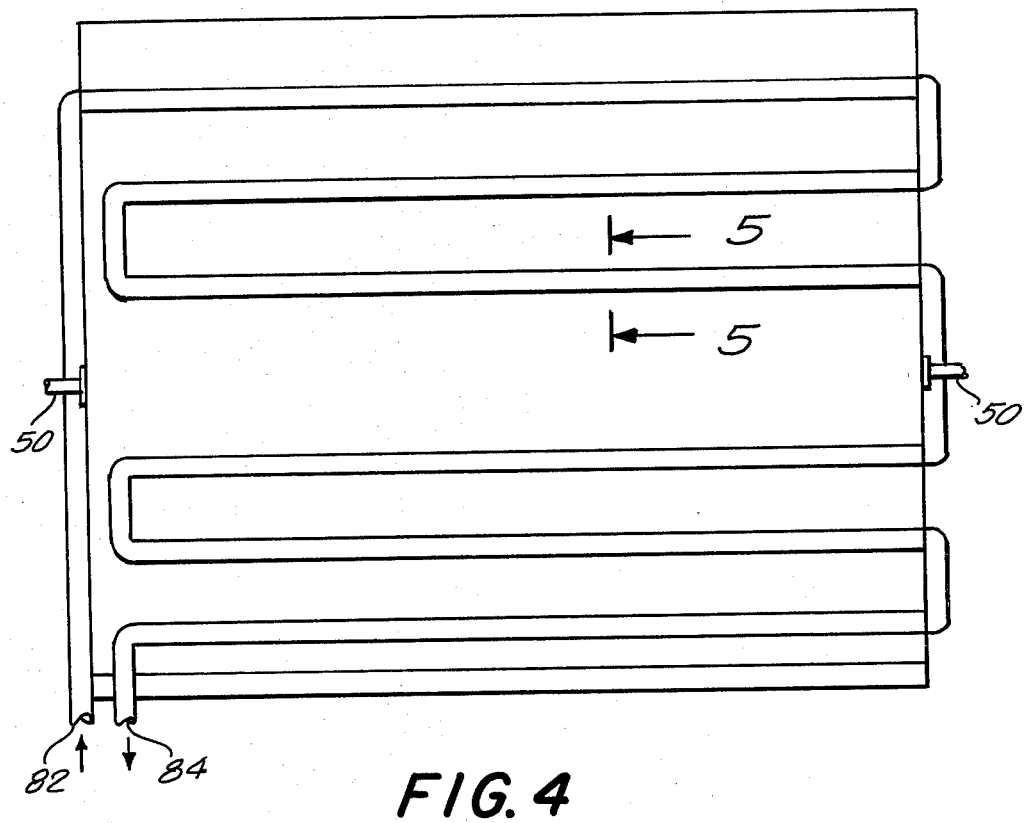
FIG. 4 is a top plan view of the solar collector panel and conduit portion of the solar collector assembly of the invention.

Solar collector assembly 46 includes an insulated solar panel 80 of well known "flat-plate" type, with ends shiftable about a fixed pivot 50 which is conventional attached to the roof truss structure 24. A serpentine arrangement of coils 52 forms a conduit for heat transfer fluid to be heated by solar energy and transported in a conventional manner to other parts of the building for storage and/or direct use. As depicted in FIG. 4, the tubing 52 is continuous with an inlet 82 on one end and an adjacent outlet 84 for transfer of the heated fluid. The serpentine coil 52 is formed in conventional fashion on insulated panel 80 and as shown end pivot connectors 50 are used to mount the panel and attached coils to the ends of the roof.

Normally the panel and attached coils would be freely pivotal about point 50, however, as shown in the depicted embodiment, the amount of movement is restricted by a flanged end closure 86 at the upper end and a pawl 88 at the lower end. The pawl includes a slot 90 to receive the lower end of the solar panel and a disc-shaped pawl 92 for automatic or manual movement as desired along an angular ratchet surface 94 mounted to the roof structure in position for engagement with the pawl wheel 92. While the manual or automatic means for shifting the solar panel and the light panel are not shown, they can be any well known device commonly used as a mechanical movement device such as hand levers or motorized actuators. The angular ratchet surface 94 and the portion of the structure from which that surface is formed can be mounted in conventional fashion such as welding to the remainder of the structure and similarly, end closure 86 can be welded or mounted in other conventional manner to the supporting structure such as by cap joint 38.

Alternatively, in the same center pivoted position as the solar collector 80, a photo-voltaic solar electric generating panel or a solar heat collector of concentrating configuration can be arrayed in lieu of solar collector 80 and controlled as to angular rotation in similar fashion vis-a-vis the diurnal and annual solar path through the sky.

Figure 5:
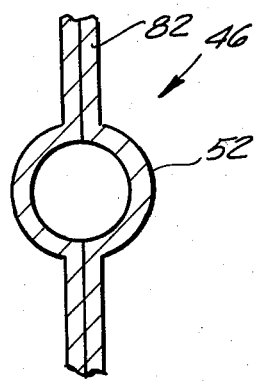
FIG. 5 is a sectional view thereof taken along the plane of line 5—5 of FIG. 4.

It is contemplated that the panel 80 and conduit arrangement 52 can be formed by a pair of adjoining insulator plates affixed or welded together with arcuate protruding portions cooperating to provide circular passageways. This system is depicted in FIGS. 4 and 5.

Figure 6:
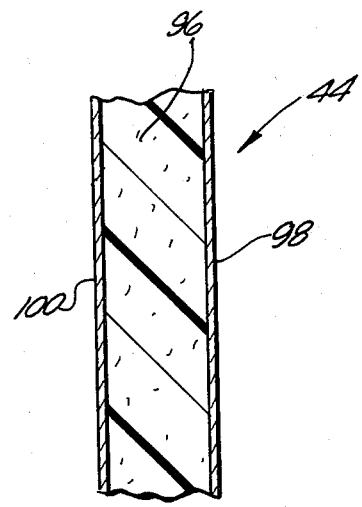
FIG. 6 is a fragmentary enlarged sectional view of the light weight insulating panel portion of the invention.

As discussed above, the insulating panel 44, as shown in FIG. 6, can have an internal insulation material 96 such as foamed plastic and an outer reflective skin 98 such as a beaded screen surface and an inner insulating and reflective skin 100. The combination can be of a laminated or other conventionally affixed combined structure for purposes of forming the panel. This type of panel is well known in the art and conventional for reflective and insulating purposes.

In the preferred form as depicted, the open U-shaped roof assembly 22 facilitates the minimization of field connections and reduces weather-proofing problems by permitting factory assembly of all elements except the capping pieces 58 and bulk head caps 59 and 61.

While the insulating panel 44 and collector panel 80 could be fixed in position at a compromise orientation with respect to the adjacent sides 36 of the truss, providing for movement of these panels allows direct-passive application of solar energy when the conditions permit; or the collection and storage when excess energy is available; or the minimization of solar heat retention by oblique angling of the panel 80 to the sun's angular path and provides insulation to reduce heat gain in summer and heat loss in winter.

The movable or shiftable insulating/reflecting panel allows for the use of solar north light when light energy for natural illumination gains exceeds heat loss or heat gain in economic terms. This depends on local climate conditions, both geographic and seasonal.

The mechanical trough 56 allows for factory or field installation of a variety of required lighting and mechanical distribution systems.

Accordingly, the advantages of the depicted and described structure are readily apparent including the efficiency of operation and lower cost in construction and assembly. A structure is provided which is of a minimum complexity and number of components and particularly provides a solar roof assembly which is capable of operating as a structural entity, providing a means for collection of solar energy, providing for insulation to aid in control of heat loss and gain, and providing for control of natural illumination into the building on which the roof assembly is interconnected.

In use, it should be kept in mind that the movable solar collector panel 80 is varied in its angular position to maximize or minimize solar gain as desired and to provide an insulating surface when desired. The solar collection assembly 46 is associated with the side of the structural assembly which is generally positioned in a southern exposure in mid-northern latitudes.

In contrast, the skylight panel 44 is associated with an adjacent truss side which is to be positioned at a generally northern orientation. It is closed to prevent heat and light transfer through the glass skylight when shifted into close contact with the glass portion of the wall. When shifted away from the wall to expose the glass portion, heat and light can more readily pass through both inwardly and outwardly and the reflecting surface of panel 44 when in the position shown on FIG. 3 serves to direct reflected sunlight downward into the building interior to add natural illumination to that transmitted directly through the glass panel 36.

It is also contemplated that in addition to the fluid conduit solar collection panel system depicted, other types of solar collectors can be used in the same manner such photo-voltaic collectors, flat plate collectors, or a focusing type of solar collector.

If further bracing is required for the roof structure, either in use or for shipping purposes, as depicted a plurality of spaced braces or bulk heads 102 can be positioned to interconnect adjacent free ends of the truss sides in a conventional manner such as by welding or bolting. These braces or bulk heads 102 are spaced in a desirable manner along the length of the side by side truss arrangements as shown in FIGS. 1 and 2.

Conventional glazing can be provided for the glass portions of the walls and appropriate conventional roofing insulation and flashing material can be used on other portions of the structural sides and on the upper surface of the bases.

The mechanical and electrical components 58 in trough 56 can be factory applied as an additional cost savings.

In construction on-site, the spacing of the trusses 24 is determined by the "packing factor" which is governed by the local latitude.

The panel 44 which is of a formed plastic sandwich type material with an interior insulating foam 96 and opposing reflecting skin surfaces 98 and 100 can be motorized to close in the horizontal position in addition to the position shown adjacent to the inside surface of the northerly exposed sides 36.

By factory installation of the troughs 34 and flashing and end bulkheads and the trough components, it is possible to provide an entire water and weather tight roof water catchment as a factory finished unit.

While the ratchet and pawl arrangement is shown for movement of the shiftable panels, it is contemplated that other control means can be provided to regulate the nature and type of movement of these panels in shifting them between their different operable positions.

It should also be kept in mind that while assembly 22 of the present invention is shown in use in forming a roof structure 24, it is also contemplated that it can be designed in wall spandrel form with appropriate solar collector assemblies and light panel members for use in other portions of a building structure such as in the vertical walls.

In conclusion, the attributes of an energy and materials efficient roof system can be described in the following manner. It should provide maximum exploitation of the energy from impinged sunlight and reflected and refracted light striking the entire roof surface. It should have means to permit an optimum utilization of this energy as desired to produce solar heat, solar electricity, natural illumination or to shed this energy when not desired. It should provide for minimization of heat loss or gain through all elements of the structure. It should provide for manipulation of these various options with economically feasible control devices and systems. It should provide controls which could incorporate computerized automated control programs responsive to the solar pathways and the diurnal, seasonal and climatic variables.

The realities of current building technology and economics suggest that the following considerations govern the development of such a roof system. The most common failures in building enclosure assemblies which plague architects, engineers, product manufacturers, fabricators and installers involve water and air leaks and weather tightness in general. The preponderant majority of errors and omissions insurance claims involve such problems. The convention of applying solar devices externally to the building does not constitute conventional wisdom but rather lack of progress. Solar devices should be integrated into the structure of new buildings and not applied onto it. An integrated solar and structural system capable of factory assembly and minimum site labor should produce appreciable cost savings.

With the above in mind, the present invention begins with the logic that a building envelope should be constructed with proven building assemblies of demonstrated weather-proof qualities and then integrate solar technology inside the water tight water envelope. Alternatively, for Retrofit conditions, the reverse should pertain, wherein external solar devices create the fewest and smallest penetrations of the weather tight envelope.

The second concept of the present invention is to recapture a solar use from the shaded area created by the packing factor. The chosen use is natural illumination by a skylight.

The third concept of the present invention is that of manipulating the direct solar source by maximizing or minimizing the solar gain; the means to do this is by simple mechanical rotation of the collector surface along the horizontal axes.

The fourth concept of the present invention is to manipulate the indirect solar source by permitting natural illumination from a skylight except when the economic gains from this source are out-weighed by undesirable heat gain or heat loss to very high or low temperatures.

The fifth concept of the present invention is to produce these manipulations in the protected interior environment of a building where, free from wind and weather stresses, the actuating and control devices can require very little motive power and can be automated and computer programmed.

The elements of the present invention include V-ended trusses formed by the upper and lower members of the sloped glass side walls and intermediate cords, column members, to connect the building columns built into assembly and walls; girders carrying the bottom ends of the inclined trusses; glazed panels in both inclined walls; and a weather-proof drainage pan and flat roof center section factory installed.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. A structural support assembly constituting a building enclosure system also used for collecting solar energy, regulating heat loss or gain and, permitting the passage of day light, and adapted to be interconnected with other structural elements to form a building, the assembly comprising:

Interconnected opposing side walls and a base forming a truss;

at least a portion of the side walls being transparent;

a solar collector assembly associated with one of the side walls, preferably one to be at a generally southern exposure when incorporated in a building in northern latitudes and vice versa in southern latitudes and being positioned to maximize solar gain;

an insulating/and reflecting panel associated with the other of the side walls, preferably one to be at a generally northern exposure when incorporated in a building in northern latitudes and vice versa in southern latitudes, and means for adjusting the panel with respect to the transparent portion of the other side wall to regulate the light received and heat loss or gain through the other side wall;

means for interconnecting the structural support assembly to other building structural elements.

2. The invention in accordance with claim 1 wherein the base is substantially horizontal and the side walls extend upwardly and outwardly from the base.

3. The invention in accordance with claim 2 wherein the assembly is adapted to form a structural roof member for a building with the base in position to support the assembly on other structural elements of the building and to form a mechanical trough for utility distribution within the building, the assemblies being arranged in side by side relationship to form the roof, with cap joints connecting adjacent free ends of each two adjacent assemblies.

4. The invention in accordance with claim 3 wherein longitudinal connection means couples an adjacent free longitudinal side wall of an assembly with each of a pair of opposed longitudinal sides of a building respectively, and lateral connection means transversely connecting each assembly to the opposing lateral sides of the building to complete a roof structure.

5. The invention in accordance with claim 1 wherein the assembly is mounted in side by side relationship with a series of similar assemblies to form a roof for a building, means provided for interconnecting the outer perimeter ends of the assemblies with the adjacent side walls of the building, adjacent side walls of each two adjacent assemblies forming a solar chamber therebetween, each solar collector assembly mounted in a solar chamber adjacent to the side wall having a generally southern exposure in northern latitudes and the skylight panel being mounted in the solar chamber in the side wall having a generally northern exposure in northern latitudes, shifting means for shifting the solar collector assembly and the panel with respect to one another and with respect to the adjacent side walls of the two side by side assemblies so as to maximize solar gain through the generally southern exposure wall and to control light passage and heat loss or gain through the northern exposure wall.

6. The invention in accordance with claim 5 wherein the solar collector assembly includes a flat-plate collector panel in an arrangement of conduits containing fluid to be heated by the solar energy to collect the heat and transfer the heat to other portions of the building.

7. The invention in accordance with claim 1 wherein rotation means is provided to rotate the solar collector assembly to maximize or minimize solar gain.

8. The invention in accordance with claim 7 wherein the collector panel is pivotally mounted so that the angle of said collector panel with respect to the adjacent one side wall can be adjusted to maximize or minimize solar gain, and limit means to control the angle of pivot of the collector plate.

9. The invention in accordance with claim 8 wherein the limit means includes a flanged cap surrounding one end of the collector panel with a space between the flanges determining the movement distance for the panel, a pawl mechanism on the other end of the collector panel for engagement with a fixed ratchet surface to provide a number of angular positions for the collector panel with respect to the position of the pawl on the ratchet surface, and means for moving the pawl along the ratchet surface to alter the angular location of the collector panel.

10. The invention in accordance with claim 6 wherein the conduits for the solar collector fluid include a serpentine arrangement of pipes mounted to the collector panel.

11. The invention in accordance with claim 1 wherein the insulating/reflecting panel is pivotally mounted to be shiftable into and away from alignment with the transparent portion of the adjacent side wall.

12. The invention in accordance with claim 11 wherein the insulating/reflecting panel is attached at one end to a fixed pivot and has a pawl member extending from the other end for interengagement with a ratchet surface whereby shifting of the pawl along the ratchet surface determines the relative position of the insulating/reflecting panel with respect to the adjacent transparent side wall.

13. The invention in accordance with claim 1 wherein the insulating/reflecting panel is formed of a reflective and insulation material to thereby facilitate the reflection of light therefrom and control of heat gain or loss therethrough.

14. The invention in accordance with claim 13 wherein the surface of the insulating/reflecting panel adjacent to the side wall of the truss is formed with a granular light dispersing surface.

15. The invention in accordance with claim 3 wherein a plurality of cross braces are positioned in spaced position along the length of each assembly and connecting adjacent side walls at predetermined locations to provide further support for the roof structure.

16. The invention in accordance with claim 3 wherein the cap joint between assemblies includes a grooved receiving slot in position to receive the free end of each assembly side therein with two grooved surfaces on each cap joint to facilitate interconnection of adjacent trusses, each side wall interconnected with the base by means of a grooved extension receiving the end of the side wall therein and affixed to the base.

17. The invention in accordance with claim 3 wherein the bases have means thereon for connection with appropriate spaced columns in the building for assisting in the support of the assemblies and means for connection of perimeter of the side by side arrangement of the assemblies to the side walls of the building.

18. The invention in accordance with claim 1 wherein the transparent portions of the assembly are formed of glass.

19. A method of minimizing or maximizing collection of solar gain, regulating light transmission and heat loss or gain in a building by the use of a structural support assembly comprising:

Forming a support system adapted to be interconnected with other structural members to form a building with the system including a truss having opposing side walls and a base;

forming at least a portion of the side walls of transparent material;

locating a solar collector assembly adjacent to one of the side walls, preferably one to be at a generally southern exposure in northern latitudes and vice versa in southern latitudes when incorporated in a building and in position to maximize solar gain;

positioning and insulating/reflecting panel adjacent the other of the side walls, preferably one to be at a generally northern exposure in northern latitudes and vice versa in southern latitudes when incorporated in a building, and adjusting the insulating/reflecting panel to regulate the light received and heat loss or gain through the other side; and the assembly being adapted to be mounted to adjacent building structural members and incorporated therewith to form the building support structure.

20. The invention in accordance with claim 19 wherein the transparent portions of the structural support assembly are formed of glass.

21. The invention in accordance with claim 19 wherein a plurality of assemblies are arranged in side by side relationship and interconnected in position to form the roof structure of the building.

22. The invention in accordance with claim 21 wherein each assembly is rigidified by the addition of a plurality of spaced braced moment connections along the length thereof interconnecting the free ends of the side walls.

23. The invention in accordance with claim 19 wherein the base is substantially horizontal and the side walls extend upwardly and outwardly from the base and terminate in a free end.

24. The invention in accordance with claim 23 wherein the base portion is formed to provide a mechanical trough for housing equipment for uses such as lighting, heating, ventilating and air conditioning distribution.

25. The invention in accordance with claim 19 wherein the solar collector assembly is adjustable to facilitate maximum or minimum solar gain received through the adjacent transparent side of the assembly.

26. The invention in accordance with claim 25 wherein the solar collector assembly includes a solar collection plate pivotally mounted at a point between its ends and, the angular rotation being limited by limit means in engagement with one end of the solar panel and a pawl on the other end shiftable along an angular ratchet surface, fluid conduits on the solar collection plate for containing fluid to absorb solar heat gain through the adjacent side wall for collection by the solar collection assembly.

27. The invention in accordance with claim 19 wherein the insulating/reflecting panel is pivotally mounted at one end and has a pawl at its other end in engagement with an angular ratchet surface so that the light panel can move toward and away from the adjacent transparent side.

28. The invention in accordance with claim 27 wherein the insulating/reflecting panel is formed of an insulation material.

29. The invention in accordance with claim 26 wherein the fluid conduits include a serpentine arrangement of tubing on an insulated solar collector panel and adapted to be interconnected with conduit means for distributing the solar collection fluid to other portions of the building.

30. The invention in accordance with claim 21 wherein the side by side arrangement of interconnected support assemblies forming the roof are interconnected on its perimeter with the side walls of the building and is adapted to have a ceiling hung from the underside thereof, and supplementally supporting the ceiling by an arrangement of columns on the interior of the building.

* * * * *